_US005992005A_

United States Patent [19]
Roessler et al.

[11] Patent Number: 5,992,005
[45] Date of Patent: Nov. 30, 1999

[54] METHOD OF MANUFACTURING A POWER MAGNETIC DEVICE

[75] Inventors: Robert Joseph Roessler, Rowlett; William Lonzo Woods, Kaufman, both of Tex.

[73] Assignee: Lucent Technologies Inc., Murray Hill, N.J.

[21] Appl. No.: 08/777,342

[22] Filed: Dec. 27, 1996

Related U.S. Application Data

[63] Continuation-in-part of application No. 08/640,583, Apr. 12, 1996, Pat. No. 5,659,462.

[51] Int. Cl.[6] ............................................. H01F 7/06
[52] U.S. Cl. ............................ 29/606; 29/607; 29/609; 29/744; 29/760; 269/8; 156/272.4; 335/285
[58] Field of Search .......................... 29/606, 607, 609, 29/744, 760; 269/8, 16, 289 R, 329; 156/272.4, 273.3, 273.5, 275.7; 335/285, 211; 336/110

[56] References Cited

U.S. PATENT DOCUMENTS

| | | | |
|---|---|---|---|
| 2,055,175 | 9/1936 | Franz | 29/606 |
| 2,692,843 | 10/1954 | Winther | 156/281 |
| 3,609,615 | 9/1971 | Parker | 336/178 |
| 4,248,653 | 2/1981 | Gerber | 156/272 |
| 4,542,890 | 9/1985 | Braillon | 269/8 |
| 4,684,112 | 8/1987 | Chernikov et al. | 269/8 |
| 5,066,936 | 11/1991 | Hsu | 335/295 |
| 5,266,914 | 11/1993 | Dickson et al. | 335/288 |

FOREIGN PATENT DOCUMENTS

267108 A1  11/1988  European Pat. Off. .

Primary Examiner—Carl E. Hall
Assistant Examiner—Davide Caputo

[57] ABSTRACT

Methods of manufacturing a magnetic device and a manufacturing tool employing the methods. One of the methods includes the steps of: (1) applying an adhesive between opposing end faces of first and second core-portions of a magnetic core of the magnetic device, (2) placing the first and second core-portions proximate a permanent magnet during a cure-time of the adhesive, the permanent magnet causing the first and second core-portions to be magnetically attracted to one another to fix the first core-portion relative to the second core-portion and (3) separating the permanent magnet from the first and second core-portions following expiration of the cure-time, the adhesive thereafter fixing the first core-portion relative to the second core-portion.

13 Claims, 4 Drawing Sheets

METHOD OF MANUFACTURING A POWER MAGNETIC DEVICE

This application is a continuation-in-part of application Ser. No. 08/640,583, entitled "Encapsulated, Integrated Power Magnetic Device and Method of Manufacture Therefor," to Chen, et al., filed on Apr. 12, 1996, U.S. Pat. No. 5,659,462, and granted on Aug. 19, 1997.

TECHNICAL FIELD OF THE INVENTION

The present invention is directed, in general, to magnetic devices and, more specifically to methods of manufacturing power magnetic devices of relatively high power density and small footprint that are highly automated and efficient.

BACKGROUND OF THE INVENTION

A magnetic device uses magnetic material arranged to shape and direct magnetic flux in a predetermined manner to achieve a desired electrical performance. The magnetic flux provides a medium for storing, transferring or releasing electromagnetic energy.

Magnetic devices most typically comprise a core having a predetermined volume and composed of a magnetic material (e.g., ferrite) having a magnetic permeability greater than that of a surrounding medium (e.g., air). A plurality of windings of a desired number of turns and carrying an electrical current surround, excite and are excited by the core (or legs thereof) Because the magnetic core has a relatively high permeability, magnetic flux produced by the windings is confined almost entirely to the core. The flux follows the path the core defines; flux density is essentially consistent over the uniform cross-sectional area of the core.

Magnetic devices are often used to suppress electromagnetic interference ("EMI"). When used in the suppression role, the efficiency with which a magnetic device stores and releases electrical power is not usually a concern. However, magnetic devices are also frequently employed to transmit, convert or condition electrical power (so-called "power magnetic devices"). When so employed (often in the environment of power supplies for electronic equipment), magnetic performance and efficiency become major concerns.

As with other types of electronic components, there is a trend in the design of power magnetic devices toward achieving increased power and volumetric density and lower device profile. To achieve higher power, the resistance of the power magnetic device must be reduced, typically by increasing the cross-sectional area of the electrical member forming the device windings. To increase the density of the power magnetic device, the windings are usually made relatively thin in the region constituting the core of the device to optimize the electrical member resistance.

Another problem associated with present-day power magnetic devices is the lack of planarity of the device terminations. Because of the need to optimize the winding thickness of the power magnetic device to provide the requisite number of turns while minimizing the winding resistance, the thickness of the electrical member forming each separate winding of the device is often varied. Variation in the winding thickness often results in a lack of planarity of the device terminations, an especially critical deficiency when the device is to be mounted onto a surface of a substrate, such as a printed circuit board ("PCB") or printed wiring board ("PWB").

A surface-mountable power magnetic device is disclosed in U.S. Pat. application Ser. No. 08/434,485, filed on May 4, 1995, to Pitzele, et al., entitled "Power Magnetic Device Employing a Leadless Connection to a Printed Circuit Board and Method of Manufacture Thereof," commonly assigned with the present invention and incorporated herein by reference. The surface-mountable power magnetic device includes a multi-layer circuit containing a plurality of windings disposed in layers and a magnetic core mounted proximate the plurality of windings. The magnetic core is adapted to impart a desired magnetic property to the plurality of windings. The plurality of windings and the magnetic core are substantially free of a surrounding molding material to allow the magnetic device to assume a smaller overall device volume. The surface-mountable power magnetic device also includes an improved termination or lead structure that attains electrical isolation and thermal conductivity without requiring a molding compound.

Pitzele, et al., further discloses a manual method of manufacturing the power magnetic device wherein, after the multi-layer flex circuit is prepared, an epoxy adhesive is applied to a first core-half of the magnetic core and the first core-half is joined to a second core-half. The magnetic core-halves are twisted to ring the adhesive and create a very minute interfacial bond line between the first and second core-halves. The magnetic cores are then held together using mechanical compression (e.g., with a clip or clamp) while the epoxy adhesive between the core halves cures.

While the method of Pitzele, et al., provides a reliable process of manufacturing a power magnetic device, innovative pick and place assembly techniques may be applied with respect to core assembly to reduce the cost and increase the manufacturing yield for such power magnetic devices. In view of the compactness of the present power magnetic devices and- the competitive pressures on price, an increase in manufacturing efficiency is highly desirable.

Accordingly, what is needed in the art is a method of manufacturing power magnetic devices having a relatively high power density and small footprint that addresses the need for automation and reliability in the production of such power magnetic devices.

SUMMARY OF THE INVENTION

To address the above-discussed deficiencies of the prior art, the present invention provides methods of manufacturing a magnetic device and a manufacturing tool employing the methods. One of the methods includes the steps of: (1) applying an adhesive between opposing end faces of first and second core-portions of a magnetic core of the magnetic device, (2) placing the first and second core-portions proximate a permanent magnet during a cure-time of the adhesive, the permanent magnet causing the first and second core-portions to be magnetically attracted to one another to fix the first core-portion relative to the second core-portion and (3) separating the permanent magnet from the first and second core-portions following expiration of the cure-time, the adhesive thereafter fixing the first core-portion relative to the second core-portion.

The present invention therefore introduces the broad concept of employing a magnet to hold core-portions together while adhesive (that preferably is to bond the core-portions together permanently) is allowed to cure. The core-portions may form a core for a transformer or inductor. Accordingly, windings may be located proximate the core either before or after its portions are joined together.

In one embodiment of the present invention, the permanent magnet is rotatably captured within a pole structure, the permanent magnet rotatable between an "on" orientation wherein the permanent magnet applies an increased magnetic field to the first and second core-portions and an "off" orientation wherein the magnetic field is reduced to allow the first and second core-portions to separate from the permanent magnet. An embodiment to be illustrated and described employs a magnetic fixture having a permanent magnet that cooperates with a pole structure. When poles of the permanent magnet are aligned with the pole structure, the pole structure itself acts as a permanent magnet, generating a magnetic field that attracts the core-portions to the pole structure. When the poles of the permanent magnet are misaligned with the pole structure, the pole structure loses much of its magnetic field-generating properties.

In one embodiment of the present invention, the method further comprises the step of interposing windings between the first and second core-portions prior to performing the step of applying. As stated above, windings may alternatively be interposed after the step of applying but prior to the step of placing. Alternatively still, the windings may be introduced to the magnetic device later in the method.

In one embodiment of the present invention, the first and second core-portions include a plurality of corresponding legs having the opposing end faces thereon. The core may therefore have an "U" or "E" configuration or any arbitrary configuration that may find particular use in a given application.

In one embodiment of the present invention, the method further comprises the step of interposing a substrate containing a plurality of conductive traces between the first and second core-portions prior to performing the step of applying. Multi-layer circuit boards are well-suited for providing windings for a magnetic device. Alternatively, however, more conventional windings may be wound about a bobbin and interposed between the core-portions or may be wound about the core-portions themselves.

In one embodiment of the present invention, the method further comprises the step of rotating the permanent magnet relative to the first and second core-portions prior to performing the step of separating. In the embodiment to be illustrated and described, rotating the permanent magnet reduces the intensity of the magnetic field generated thereby and thus allows the core-portions to separate therefrom. Alternatively, the permanent magnet can be translated away from a radius $r_1$ to a radius $r_2$ from the core-portions, causing the magnetic field to attenuate as a function of $(r_2-r_1)^2$. At some $r_2$, the magnetic filed becomes small enough to allow the core-portions to release.

In one embodiment of the present invention, the adhesive is an epoxy adhesive. Those skilled in the art will readily understand, however, that other adhesives are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
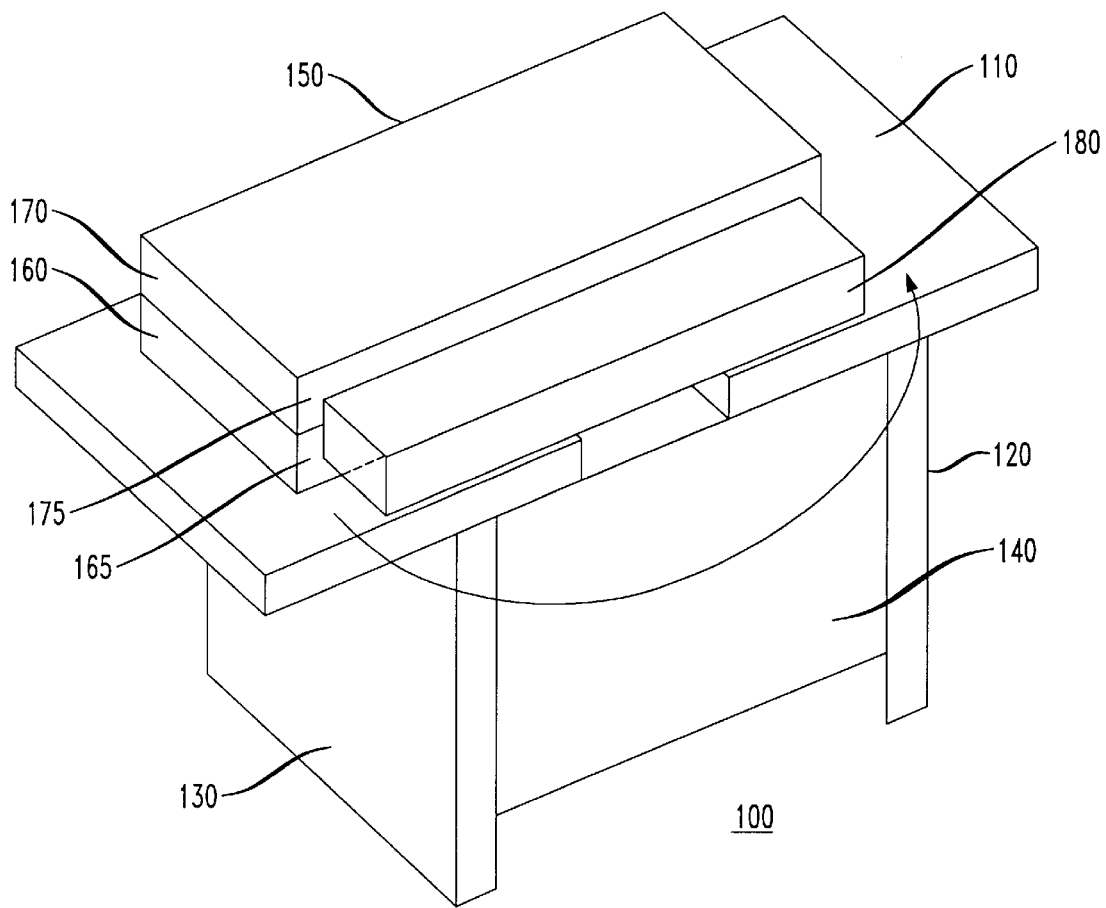
FIG. 1 illustrates an isometric view of an embodiment of a magnetic fixture employable for constructing a power magnetic device according to the principles of the present invention.

Referring initially to FIG. 1, illustrated is an isometric view of an embodiment of a magnetic fixture 100 employable for constructing a power magnetic device 150 (having a first and second core-portion 160, 170) according to the principles of the present invention. The magnetic fixture 100 includes a mounting plate 110 couplable to the power magnetic device 150. The magnetic fixture 100 also includes a pole structure (having a first and second pole 120, 130) and a magnet 140 rotatably captured within the pole structure. The magnet 140 rotates between an "on" orientation, wherein the magnet 140 applies an increased magnetic field to the first and second core-portions 160, 170 and an "off" orientation, wherein the magnetic field is reduced to allow the first and second core-portions 160, 170 to separate from the magnet 140.

More specifically, when poles of the magnet 140 are aligned with the pole structure, the pole structure itself acts as a permanent magnet, generating a magnetic field that attracts the first and second core-portions 160, 170 to the pole structure of course, those skilled in the art should understand that the magnetic field created by the magnet is of sufficient strength to maintain the alignment and bond between the first and second core-portions 160, 170. When the poles of the magnet 140 are misaligned (e.g., by rotating the magnet 140 relative to the pole structure) with the pole structure, the pole structure loses much of its magnetic field-generating properties. In the latter case, the mounting plate 110 acts like a "keeper" thereby releasing the first and second core-portions 160, 170 therefrom. The magnetic fixture in the present embodiment is a magnetic switch manufactured by Garland Services, Inc. of Garland, Tex.

The first and second core-portions 160, 170 of the power magnetic device 150 include a plurality of corresponding legs (a first leg 165 of the first core-portion 160 and a matching first leg 175 of the second core-portion 170 are illustrated in the present embodiment) having opposing end faces (not shown) thereon, respectively. The power magnetic device 100 also includes a substrate 180 containing a plurality of conductive traces (embodying a plurality of windings) interposed between the first and second core-portions 160, 170. Multi-layer circuit boards are well-suited for providing the windings for the power magnetic device 100. Alternatively, the plurality of windings may be part of a multi-layer flex circuit. The first and second core-portions 160, 170 and windings, in either case, form a transformer power magnetic device 100.

Figure 2:
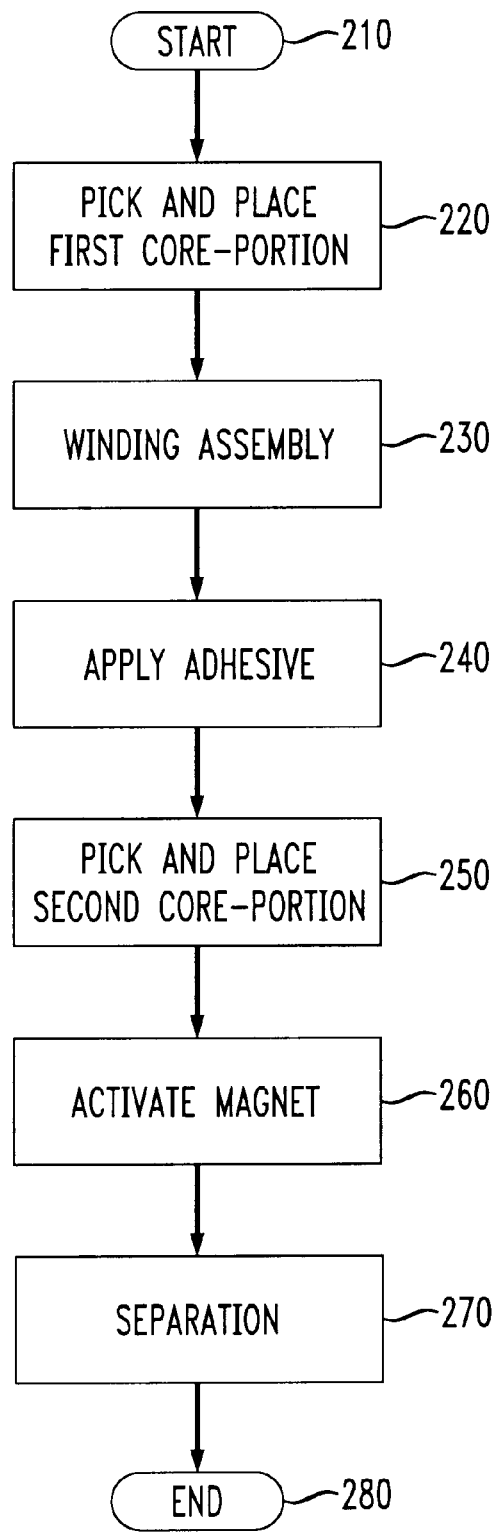
FIG. 2 illustrates a flow diagram of an embodiment of a method of constructing a power magnetic device according to the principles of the present invention.

Turning now to FIG. 2, illustrated is a flow diagram of an embodiment of a method of constructing a power magnetic device (having a first and second core-portion, the first and second core-portion each having at least one leg) according to the principles of the present invention. The method commences at a start step 210. The first core-portion, composed of a magnetic material and having first and second legs associated therewith, is provided for during a pick and place first core-portion step 220. The first leg and second legs of the first core-portion each have a first end face and second end face, respectively. A winding assembly is then fitted onto the first core-portion during a winding assembly step 230. The winding assembly is disposed about first and second winding apertures and the first and second legs pass through the first and second winding apertures, respectively, to couple the first and second windings magnetically to the first and second legs, respectively.

Next, at an apply adhesive step 240, an adhesive (e.g., an epoxy adhesive) is disposed on the first and second end faces of the first and second legs, respectively. The second core-portion composed of the magnetic material is then joined to the adhesive during a pick and place second core-portion step 250. The second core-portion is adapted to mate with the first and second legs of the first core-portion and the adhesive is curable to provide a bond between the first and second core-portions.

The first and second core-portions are then placed proximate a magnet (and the magnet is actuated) during a cure-time of the adhesive at an actuate magnet step 260. The magnet causes the first and second core-portions to be magnetically attracted to one another to fix the first core-portion relative to the second core-portion. In other words, the magnet aligns and maintains the relative position of the first and second core-portions while the epoxy is curing. Following expiration of the cure-time, the magnet is separated from the first and second core-portions at a separation step 270. The process for constructing a power magnetic device is therein completed at an end step 280.

Figure 3:
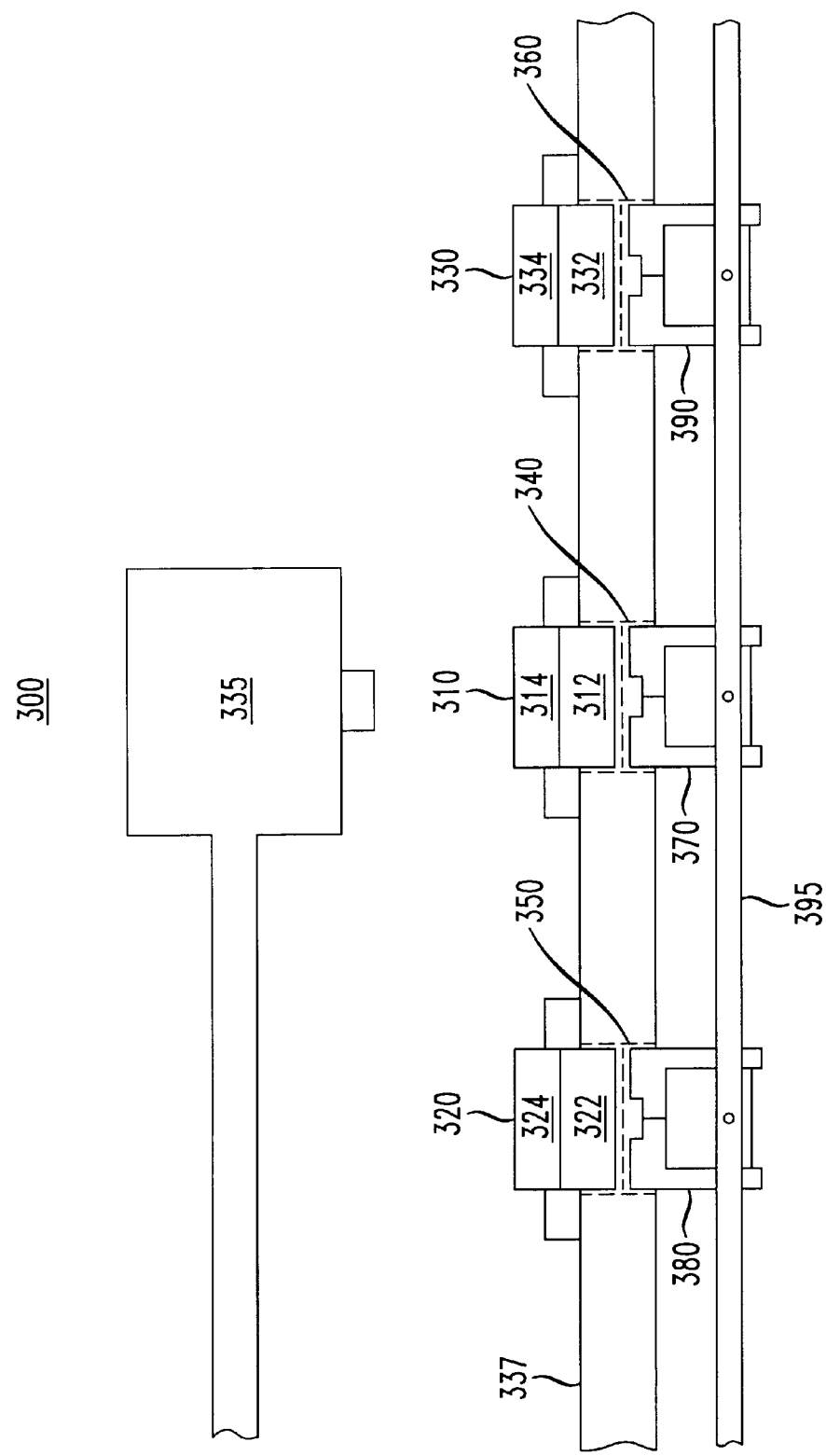
FIG. 3 illustrates a cross-sectional view of an embodiment of a manufacturing tool employable for constructing power magnetic devices according to the principles of the present invention.

Turning now to FIG. 3, illustrated is a cross-sectional view of an embodiment of a manufacturing tool 300 employable for constructing power magnetic devices 310, 320, 330 according to the principles of the present invention. While the previous FIGUREs illustrate the principles of the present invention with respect to a single power magnetic device, the present embodiment of the tool 300 is employable for constructing a plurality of power magnetic devices 310, 320, 330. The tool 300 includes a pick and place assembly arm 335 for placing components of the power magnetic devices 310, 320, 330 on a tray 337. The tray 337, having a plurality of receptacles 340, 350, 360 therein, receives first or second core-portions (the first core-portion 312, 322, 332, in the illustrated embodiment) of the magnetic cores of the power magnetic devices 310, 320, 330, respectively. An adhesive is placed between opposing end faces of the first and second core-portions 312, 314, 322, 324, 332, 334. The tool 300 also includes a plurality of magnets 370, 380, 390 associated with the plurality of receptacles 340, 350, 360, respectively. The magnets 370, 380, 390 cause the respective ones of the first and second core-portions 312, 314, 322, 324, 332, 334 to be magnetically attracted to one another to fix the first core-portions 312, 322, 332 relative to the second core-portions 314, 324, 334, respectively, during a cure-time of the adhesive.

The tool 300 further includes a mechanism (e.g., a rotational arm) 395 for separating the plurality of magnets 370, 380, 390 from the first and second core-portions 312, 314, 322, 324, 332, 334 following expiration of the cure-time. The adhesive thereafter fixes the first core-portions 312, 322, 332 relative to the second core-portions. 314, 324, 334, respectively.

Of course, those skilled in the art should recognize that the previously described magnetic fixture and manufacturing tool are submitted for illustrative purposes only, and other permanent magnet devices, manufacturing tools and processes adapted to impart a magnetic field for the construction of magnetic devices are well within the broad scope of the present invention.

Figure 4:
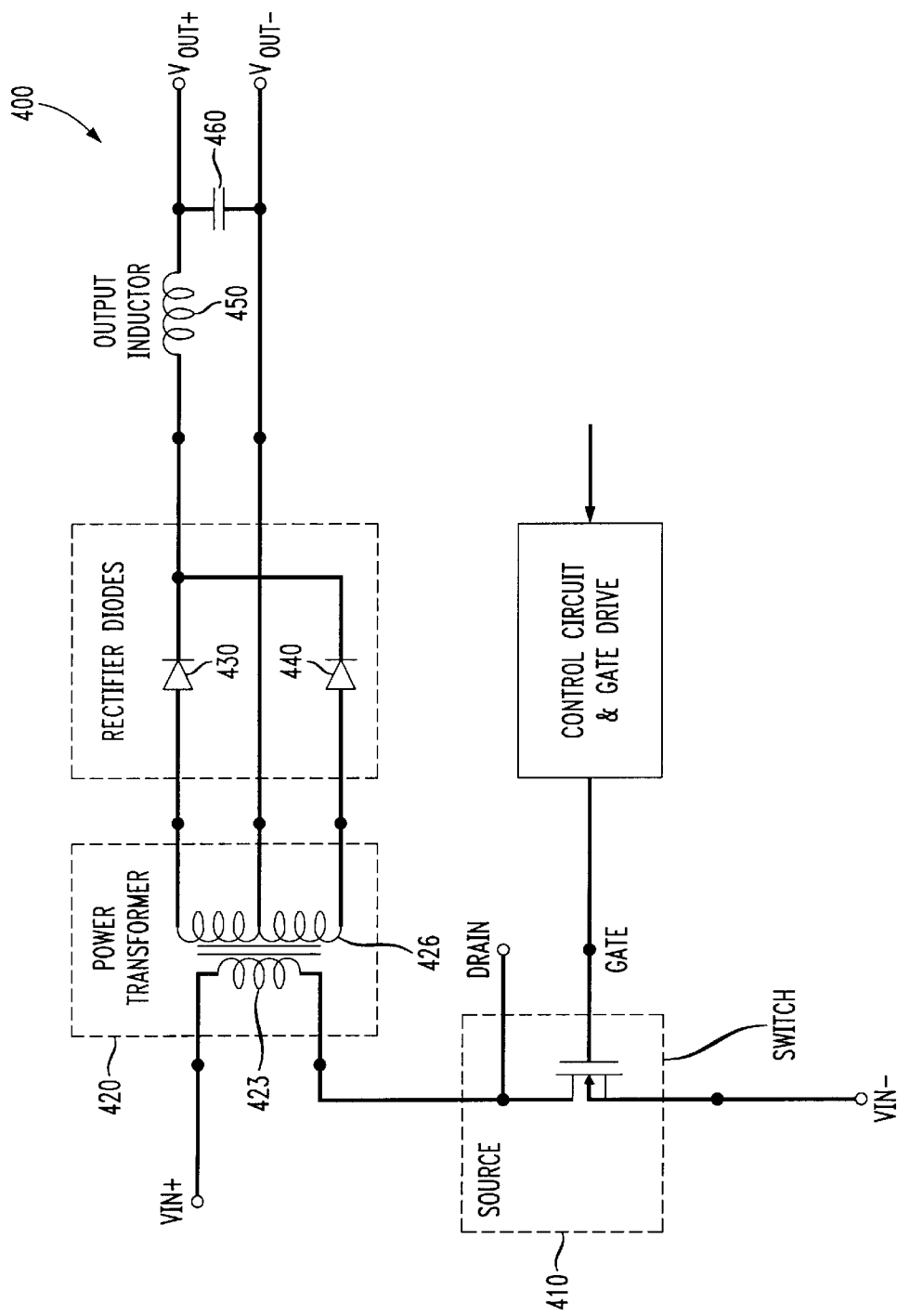
FIG. 4 illustrates a schematic diagram of a power supply employing a power magnetic device constructed according to the principles of the present invention.

FIG. 4 illustrates a schematic diagram of a power supply 400 employing a power magnetic device 420 constructed according to the principles of the present invention. The power supply 400 includes a power train having a conversion stage including a power switching device 410 for receiving input electrical power $V_{IN}$ and producing therefrom switched electrical power. The power supply 400 further includes a filter stage (including an output inductor 450 and output capacitor 460) for filtering the switched electrical power to produce output electrical power (represented as a voltage $V_{OUT}$). The power supply 400 still further includes the power magnetic device (e.g., transformer) 420, having a primary winding 423 and a secondary winding 426, and a rectification stage (including rectifying diodes 440, 430) coupled between the power conversion stage and the filter stage. The transformer 420 is constructed according to the principles of the present invention as previously described.

For a better understanding of power electronics including power supplies and conversion technologies see "Principles of Power Electronics," by J. G. Kassakian, M. F. Schlecht and G. C. Verghese, Addison-Wesley (1991). For a better understanding of magnetic devices and construction techniques therefor see "Handbook of Transformer Applications," by William Flanagan, McGraw Hill Book Co. (1986). The aforementioned references are herein incorporated by reference.

Although the present invention has been described in detail, those skilled in the art should understand that they can make various changes, substitutions and alterations herein without departing from the spirit and scope of the invention in its broadest form.

What is claimed is:

1. A method of manufacturing a magnetic device, comprising:

applying an adhesive on a portion of opposing faces of first and second core-portions of a magnetic core of said magnetic device;

placing said first and second core-portions proximate a permanent magnet during a cure-time of said adhesive, said permanent magnet causing said first and second core-portions to be magnetically attracted to one another to fix said first core-portion relative to said second core-portion; and separating said permanent magnet from said first and second core-portions following expiration of said cure-time, said adhesive thereafter fixing said first core-portion relative to said second core-portion.

2. The method as recited in claim 1 wherein said permanent magnet is rotatably captured within a pole structure, said permanent magnet rotatable between an "on" orientation wherein said permanent magnet applies an increased magnetic field to said first and second core-portions and an "off" orientation wherein said magnetic field is reduced to allow said first and second core-portions to separate from said permanent magnet.

3. The method as recited in claim 1 further comprising interposing windings between said first and second core-portions prior to performing said applying.

4. The method as recited in claim 1 wherein said first and second core-portions include a plurality of corresponding legs having opposing end faces thereon, said adhesive applied to said opposing end faces of said plurality of corresponding legs.

5. The method as recited in claim 1 further comprising interposing a substrate containing a plurality of conductive traces between said first and second core-portions prior to performing said applying.

6. The method as recited in claim 1 further comprising rotating said permanent magnet relative to said first and second core-portions prior to performing said separating.

7. The method as recited in claim 1 wherein said adhesive is an epoxy adhesive.

8. A method of manufacturing a magnetic device, comprising:

provided a first core-portion composed of a magnetic material and having first and second legs associated therewith, said first leg having a first end face and said second leg having a second end face;

fitting a winding assembly, having first and second winding apertures, onto said first core-portion, said first and second legs passing through said first and second winding apertures, respectively, to couple said first and second windings magnetically to said first and second legs, respectively;

disposing an adhesive on said first and second end faces;

joining a second core-portion composed of said magnetic material to said adhesive, said second core-portion adapted to mate with said first and second legs of said first core-portion, said adhesive curable to provide a bond between said first and second core-portions; and coupling a magnetic fixture to said second-core portion, said magnetic fixture adapted to align and impart a magnetic field to said first and second core-portions to hold said first and second core-portions together while said adhesive cures.

9. The method as recited in claim 8 wherein said magnetic fixture comprises a permanent magnet rotatably captured within a pole structure, said permanent magnet rotatable between an "on" orientation wherein said magnetic field is increased to hold said first and second core-portions together while said adhesive cures and an "off" orientation wherein said magnetic field is reduced to allow said first and second core-portions to separate from said permanent magnet.

10. The method as recited in claim 8 wherein said fitting comprises fitting a substrate containing a plurality of conductive traces onto said first core-portion.

11. The method as recited in claim 8 further comprising separating said magnetic fixture from said second-core portion.

12. The method as recited in claim 11 further comprising rotating a permanent magnet within said magnetic fixture relative to said second core-portion to cause said second core-portion to separate therefrom.

13. The method as recited in claim 8 wherein said adhesive is an epoxy adhesive.

* * * * *